(12) United States Patent
Fish

(10) Patent No.: US 8,490,206 B1
(45) Date of Patent: Jul. 16, 2013

(54) APPARATUSES, METHODS AND SYSTEMS FOR REPUTATION/CONTENT TRACKING AND MANAGEMENT

(75) Inventor: Charles M. Fish, New Hope, PA (US)

(73) Assignee: Time Warner, Inc., New York, NY (US)

( * ) Notice: Subject to any disclaimer, the term of this patent is extended or adjusted under 35 U.S.C. 154(b) by 1244 days.

(21) Appl. No.: 11/863,621

(22) Filed: Sep. 28, 2007

(51) Int. Cl.
    *H04L 29/06* (2006.01)
(52) U.S. Cl.
    USPC ............................................ 726/30
(58) Field of Classification Search
    None
    See application file for complete search history.

(56) References Cited

U.S. PATENT DOCUMENTS

| | | | |
|---|---|---|---|
| 5,918,223 A | 6/1999 | Blum et al. | |
| 2003/0037010 A1* | 2/2003 | Schmelzer | 705/67 |
| 2004/0093493 A1 | 5/2004 | Bisbee et al. | |
| 2004/0117628 A1 | 6/2004 | Colvin | |
| 2005/0154680 A1 | 7/2005 | Schmelzer | |
| 2005/0154681 A1 | 7/2005 | Schmelzer | |
| 2005/0182726 A1 | 8/2005 | Honeycutt et al. | |
| 2006/0048237 A1 | 3/2006 | Luo et al. | |
| 2007/0209077 A1 | 9/2007 | Kitani | |
| 2007/0239684 A1* | 10/2007 | Anderson et al. | 707/3 |
| 2007/0256033 A1* | 11/2007 | Hiler | 715/860 |
| 2008/0178302 A1* | 7/2008 | Brock et al. | 726/32 |
| 2008/0209502 A1* | 8/2008 | Seidel | 726/1 |
| 2008/0235200 A1* | 9/2008 | Washington et al. | 707/4 |

OTHER PUBLICATIONS

PCT International Search Report/ PCT Written Opinion dated Dec. 5, 2008.

* cited by examiner

*Primary Examiner* — David Pearson
(74) *Attorney, Agent, or Firm* — Chadbourne & Parke LLP

(57) ABSTRACT

The disclosure details the implementation of APPARATUSES, METHODS AND SYSTEMS FOR REPUTATION/CONTENT TRACKING AND MANAGEMENT ("REPTRACK") which provides a straightforward, dynamic and comprehensive way for managing and monitoring posting of content onto a publicly accessible website. As taught by the disclosure, in one embodiment, the REPTRACK controls posting of content onto a publicly accessible website based upon a determined level of trust associated with a submitter of content. The REPTRACK may be configured to be especially sensitive to copyrighted material. In one implementation, in addition to determining a level of trust for the submitter of the content, the REPTRACK may determine and generate fingerprints, watermarks and/or other information for embedding in or to be associated with the uploaded content, and may base posting decisions on this determination.

22 Claims, 6 Drawing Sheets

APPARATUSES, METHODS AND SYSTEMS FOR REPUTATION/CONTENT TRACKING AND MANAGEMENT

FIELD

The present invention is directed generally to an apparatuses, methods, and systems for data management, and more particularly, to APPARATUSES, METHODS AND SYSTEMS FOR REPUTATION/CONTENT TRACKING AND MANAGEMENT.

BACKGROUND

Watermarking has been used for hundreds of years to verify the authenticity and prevent forgeries of paper goods. Similarly, digital watermarking may be used to uniquely identify electronic content. File hosting services allow users to upload files to an Internet website. The stored files may then be made accessible to other users.

SUMMARY

User submitted digital content has become an important element of the Internet. Publicly accessible websites such as YouTube, MetaCafe, Google Video and like user-generated content sites ("UGCS" collectively) allow users to watch and share video content. Although much of the content is created by users, some of the uploaded content is copyrighted (e.g., copyrighted content ripped from TV shows). As such, UGCSs may be faced with law suits for copyright infringement for unauthorized copyrighted content uploaded by third party users (i.e., not the copyright owner). Although UGCSs may sometimes remove such content when they become aware of it, the processes of locating the content, notification and takedown is burdensome, inefficient, able to be circumvented, and slow.

The disclosure teaches APPARATUSES, METHODS AND SYSTEMS FOR REPUTATION/CONTENT TRACKING AND MANAGEMENT (hereinafter "REPTRACK"), which provides a straightforward, dynamic and comprehensive way for managing and monitoring posting of content onto a publicly accessible website. In one embodiment, the REPTRACK controls posting of content onto a publicly accessible website based upon a determined level of trust associated with a submitter of content. In one implementation, the determination may optionally include the checking of fingerprints, watermarks and/or other information embedded in or associated with said content prior to or during the uploading of the content to the UGCS.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Reputation/Content Tracking and Management

For the purpose of illustrating functionality associated with the REPTRACK, the following discussion includes the REPTRACK implemented in the context of user-submitted video hosting. However, it is to be understood there is significant flexibility, scalability, and adaptability associated with the REPTRACK. As such, there are a wide variety of possible implementations of the REPTRACK that may be configured to meet the needs of a variety of users and/or implementers.

Figure 1:
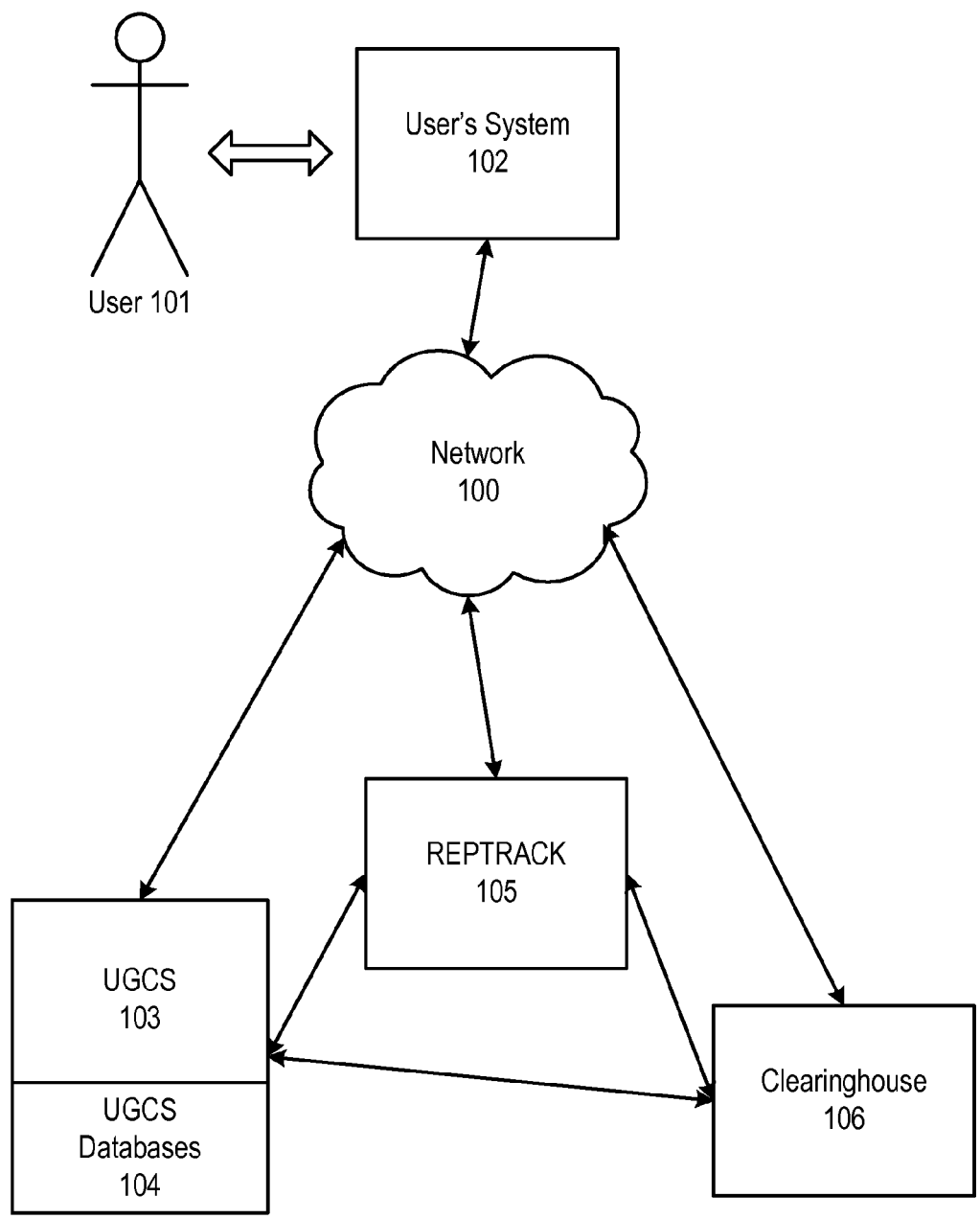
FIG. 1 is an overview diagram illustrating aspects of the REPTRACK.

FIG. 1 provides a high level overview diagram illustrating the various entities that are involved in one embodiment of the REPTRACK. A user 101 utilizes their system 102 (e.g., computer, PDA, cell phone, set-top box, entertainment system, etc.) to connect to a network 100 (e.g., the Internet). Once connected, the user may access a user-generated content site ("UGCS") 103. For example, the user may navigate to publicly accessible websites such as YouTube, MetaCafe, Google Video and/or the like. From there, the user can view hosted content, and may upload their own video content. The UGCS 103 utilizes databases 104 and/or like methods to store and/or host submitted content. The UGCS 103 may utilize the REPTRACK 105 to lower the risk of inadvertently hosting restricted (i.e., copyrighted) content (e.g., videos ripped from television broadcasts). The UGCS 103 and/or the REPTRACK 105 may utilize an internal or third party clearinghouse 106 to review and/or examine submitted content for fingerprints/watermarks of content owners. In one implementation the REPTRACK 105 is incorporated into the UGCS 103, while in another implementation the REPTRACK 105 is stand-alone.

A UGCS may implement the REPTRACK 105 to provide themselves with an effective level of protection against users posting copyrighted content that is not so restrictive that it scares off legitimate potential posters. In one embodiment, the REPTRACK 105 operates to maximize the user experience of potential content posters by establishing a level of trust for at least some subset of users. In one implementation, highly trusted posters may encounter few hurdles, in terms of "number of clicks/keystrokes" and/or waiting time, to successful posting of their submitted content. Less trusted posters may encounter higher hurdles. The REPTRACK-associated hurdles the user encounters are commensurate with the user's level of trust. In one embodiment, trust levels may tiered, for example: a high trust level with very short or no delay between submission and posting, a medium trust level with moderate delay, and a low trust level with a longer delay. In another embodiment, the trust level of users (and the associated hurdles) may be distributed across a spectrum. For example, in one embodiment, less trusted users may encounter longer waiting times, but if they are only somewhat less trusted, they may still receive solicitous treatment such as gently-phrased requests for additional information and/or entertaining diversions such as games to play, music to listen to, and/or videos to watch while they are waiting for the clearinghouse 106 or UGCS 103 to determine whether or not to post the content that they have submitted.

Figure 2:
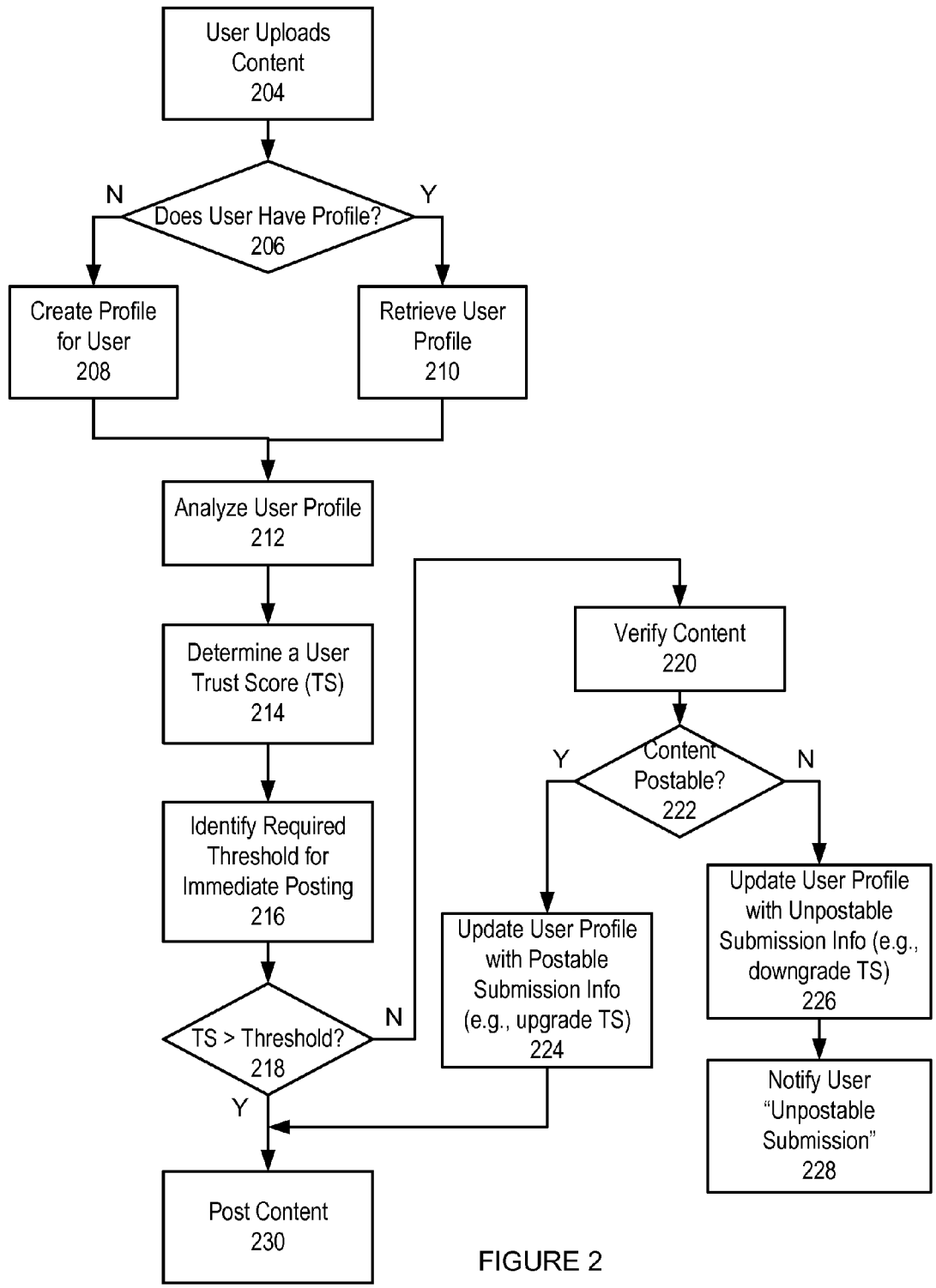
FIG. 2 provides a data flow diagram illustrating aspects of user trust determination for an embodiment of the REPTRACK.
Figure 3:
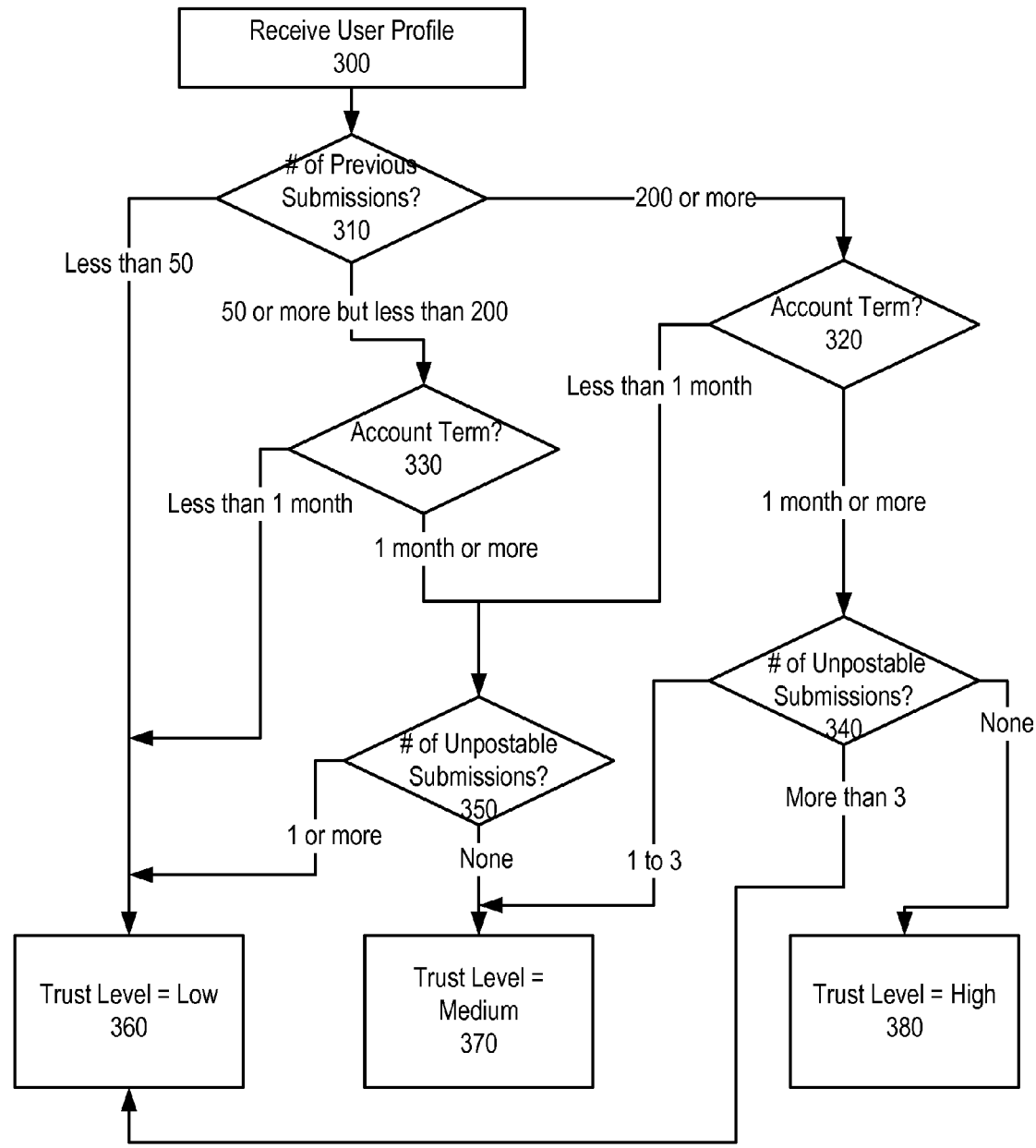
FIG. 3 is an example logic flow diagram illustrating aspects of profile analysis and trust level determination for an embodiment of the REPTRACK.

FIG. 2 provides a flow diagram illustrating aspects of user trust determination for an embodiment of the REPTRACK. When a user uploads or submits content 204 (e.g., a video file), the REPTRACK determines if the user has a stored track record or profile 206. For example, if the user has to log in to the UGCS to submit content, the user's profile may correspond to and/or be associated with the user's login and/or account. Alternatively or additionally, the user's profile may be determined or retrieved based on a cookie stored on the user's system. If the user does not have a profile 206, the REPTRACK may create a profile for the user 208. Alternatively, if the user is not logged in, the REPTRACK may prompt the user to log in, and if the user is a new user, create a new account/profile. If the user does have a profile, the REPTRACK retrieves the user profile 210 (e.g., from a profile and/or user database). The REPTRACK analyzes the user profile 212 to determine a trust level or trust score 214. The REPTRACK may utilize multiple indicia of trust, for example, the number of acceptable uploads a user has submitted. FIG. 3 provides additional detail regard trust level determination for an embodiment of the REPTRACK. The stored user profile may include a previously determined trust score or metric, and the analysis 212 may be used to update the level or score. For example, if the profile indicated that the some of the user's previously submitted content had to be removed, the REPTRACK may lower the user's trust score.

The REPTRACK determines the required trust threshold for immediate posting 216 (and/or other hurdle thresholds). If the user's trust score exceeds the threshold 218, the REPTRACK may post the uploaded content 230. If the user's trust score is less than the threshold 218, the REPTRACK may verify the content 220. Verifying the content may include forwarding (and/or instructing users to forward) prospective posted content to an internal clearinghouse and/or third party clearinghouse. The clearinghouse may then perform various rights verifications and/or checks such as examining said content for fingerprints or watermarks of content owners and providing an indication to the REPTRACK and/or potential posting sites of the presence or absence of said fingerprints/watermarks. In another embodiment, checking for fingerprints/watermarks may be left to the intended upload site such as, for example, any UGCS. If the content is determined to be postable 222, the REPTRACK updates the user's profile with the postable submission information and/or upgrade the user's trust score 224 and posts the submitted content 230. If the content is not postable 222, the REPTRACK updates the user's profile with the unpostable submission information and/or downgrades the user's trust score 226. The REPTRACK may also notify the user that the uploaded content is unpostable 228. In one embodiment, content is deemed to be in a "postable" state when it is determined that the content has been supplied by authorized persons. In another embodiment, postability may alternatively or additionally be determined according to the results of one or more rights verification procedures.

In a further embodiment, the REPTRACK may perform an initial analysis on uploaded content to determine if more or fewer measures should be taken to determine the postability of the content. For example, if the uploaded content is a very short video clip, it may not be necessary and/or economical to perform all of the above postability steps. Alternatively, if the video file is large (i.e., a long clip and/or a high resolution clip), additional measures may be indicated to assure the upload is postable (i.e., does not infringe copyright).

FIG. 3 provides an example logic flow diagram illustrating aspects of profile analysis and trust level determination for an embodiment of the REPTRACK. As shown in the figure, the REPTRACK receives the user's profile 300. The profile may contain multiple indicia indicative of the trustworthiness of the user. The REPTRACK examines the profile to determine the number of previous submissions or uploads the user has completed 310. If the number of submission is less than a certain threshold (e.g., 50 submissions), the REPTRACK may assign the user a low trust level 360.

If the number of submission is greater than the lowest threshold but less than the secondary threshold (e.g., greater than 50 submissions but less than 200), the REPTRACK may determine the account term of the user 330. In some embodiments, newer users may be given a relatively lower trust level until they have had a relationship with the REPTRACK for a given period of time. For example, the figure shows that if the user's account term is less than one month 330, the user may be assigned a low trust level 360 even if they have uploaded more than the lowest threshold. This allows the REPTRACK to avoid being manipulated or gamed, for example, by new users (or experienced user register new accounts) who may submit numerous innocuous videos in order to gain a higher level of trust so that they can upload ripped or restricted videos. If the user has an account term of one month or greater 330, the REPTRACK determines the number of unpostable or forbidden submissions 350. If the user has uploaded one or more unpostable submissions, the REPTRACK may assign the user a low trust level 360. If none of the user's submissions have been deemed to be unpostable 350, the REPTRACK may assign the user a medium trust level 370.

The figure shows that if the REPTRACK determines a user has 200 or more previous submissions 310, the REPTRACK determines the account term 320. If the account term is less than one month 320, the REPTRACK determines the number of unpostable submissions and applies the rules described above 350 (i.e., assigns a low trust level if there was one or more unpostable submissions and a medium trust level if there were no unpostable submissions). If the user has an account term of a month or more 320, the REPTRACK still checks the number of unpostable submissions 340, but applies a different rule. If there are more than three unpostable submissions 340, the user may be assigned a low trust level 360. If the user has between one and three unpostable submissions 340, the REPTRACK may assign a medium trust level 370 to the user. If the user has 200 or more uploads 310, and account term of one month or more, and no unpostable submissions 340, the REPTRACK may assign the user a high trust level 380. Although the figure shows specific numerical thresholds, the REPTRACK is flexible and may be configured to utilize a variety of thresholds and/or rules. For example, certain embodiments may utilize percentage thresholds (e.g., percentage of submissions that are unpostable). The elements shown in FIG. 3 provide an illustrative example for an embodiment of the REPTRACK. Depending on the embodiment and/or implementation, other elements, such as identity verification and behavior analysis, may be included, and other elements excluded.

In one embodiment, the REPTRACK may control posting of copyrighted material by including embedding, fingerprinting, and/or watermarking software and/or hardware in potential upload client systems. Such implementation may include having software and/or hardware fingerprint/watermark content for uploading with or without the knowledge of the user of said client systems. Some implementations of the REPTRACK do not include embedding fingerprinting/watermarking software and/or hardware in potential upload client systems. For example, it may be assumed that content owners and/or device makers will take explicit actions to fingerprint/watermark content.

As discussed above, some embodiments of the REPTRACK may withhold posting of content if fingerprints/watermarks that match those of copyrighted works are detected. The REPTRACK may also withhold posting if attempts to remove fingerprints/watermarks, or sufficiently probable indications of such tampering, are detected.

In one embodiment, the REPTRACK embargos content until such time as the examination of the content for fingerprints/watermarks can be completed, i.e., delaying posting of content until analysis of the content is complete. In another embodiment, the REPTRACK may indicate provisionally posting a deliberately altered or modified version of the content until such time as the analysis of such content for fingerprints/watermarks or attempts to remove the same can be completed. Deliberate alteration of content may include, for example, such techniques as severely reducing the video resolution, leaving out segments of audio/video, inserting a delay between the audio and video, inserting a message indicating the status of the content, inserting a ghost image, adding a caption, obscuring portions of audio or video, and/or the like.

Embodiments of the REPTRACK may operate flexibly to improve the experience for the user. Upon submission of a potential post, the REPTRACK, clearinghouse or UGCS may perform only a relatively simple check to see if the content in that potential post is similar to known copyrighted content. For example, only a few possible fingerprint items such as the title and/or metadata and/or one or a few time samples of the submitted data may be checked as a "first cut". If this first examination reveals that the submitted content appears to be very dissimilar to known copyrighted content, it may be posted without further checking However, if this first examination reveals that the submitted content appears only marginally dissimilar (e.g., the level of confidence in the results of the examination is not sufficiently high), then some additional time samples of the content may be examined, and/or more sophisticated signal processing may be performed on the original time samples and/or additional time samples, to try to establish a greater degree of confidence in the results. However, if the first cut examination reveals that the submitted content appears similar to known copyrighted content, then a second cut examination that involves examining a large amount of the submitted content and/or very sophisticated signal processing may be performed.

In some implementations, the REPTRACK may additionally or alternatively use trust levels or trust scores of potential posters to determine the level of fingerprint checking For example, if submitted content appears dissimilar to known copyrighted content, and the submitter is highly trusted, that content may simply be posted with no further checking, whereas if the level of trust in the submitter is only moderate, some additional, but still relatively limited, number of time samples of that content may be checked before deciding whether or not to post that content.

Depending on the embodiment, the REPTRACK operates flexibly by varying the level of checking based upon the content type and/or rules provided by content owners. For example, more exhaustive checking may be performed for submissions labeled or suspected to be "high resolution." The resolution may be inferred, for example, from the file type and/or determined by signal processing performed by the client, clearinghouse, UGCS and/or REPTRACK. The clearinghouse and/or UGCS may establish checking levels or levels may be based upon rules specified by content owners, and such rules may vary from one content owner to another.

Some embodiments of the REPTRACK may include using a "universal client" which allows more or less automatic authorization for trusted posters, but which client may be revoked (automatic authorization disabled) by the REPTRACK, clearinghouse, UGCS and/or content owners, should that client subsequently become untrusted. For example, even though the submission history of a given client may cause the REPTRACK and/or other entities to assign a high level of trust to a given client at a given time, subsequent unacceptable submissions may cause the REPTRACK/clearinghouse/UGCS/content owner(s) to assign a lower level of trust to a that client, i.e., to revoke automatic or simplified authorization for submissions from that client.

Figure 4A:
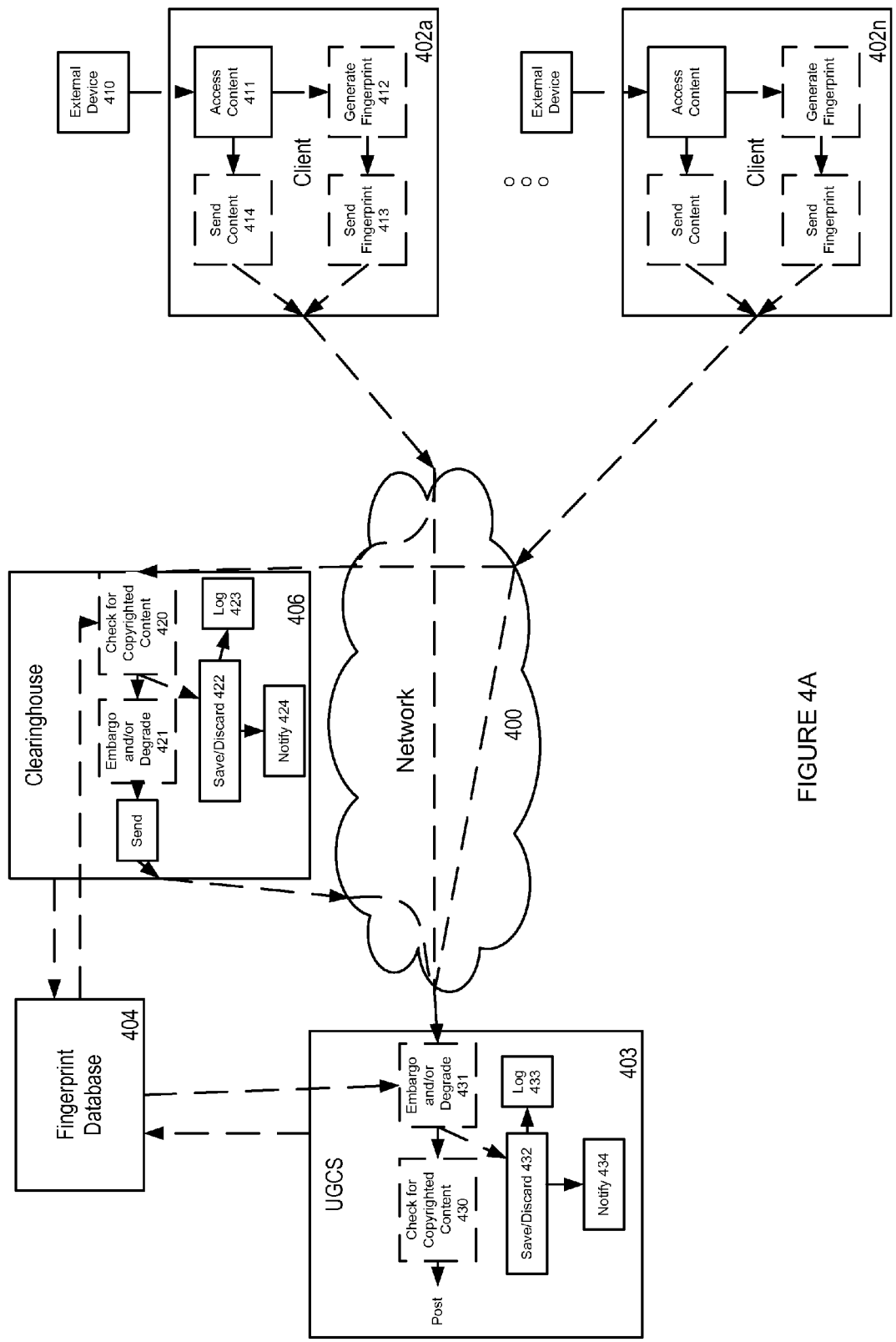
FIGS. 4A-4B provide details for implementations of some embodiments of; the REPTRACK

FIG. 4A provides an overview summary for some embodiments of the REPTRACK implemented by a UGCS 403 and/or clearinghouse 406. Clients 402a-402n wishing to upload content to a UGCS 403 (there may be many UGCSs, not shown) are connected to the UGCS 403 either directly, via the Network 400, or indirectly, via a clearinghouse 406. A given client 402a maybe connected to a UGCS 403 either directly or indirectly for any given upload, although in some implementations of the REPTRACK, certain clients may always be connected directly or indirectly. A client 402a wishing to upload content first accesses said content 411, which may have previously been downloaded to that client via the network 400 or an external device 410. In some embodiments, the client may generate a fingerprint for the content 412, and then send that fingerprint 413 to either the clearinghouse 406 or the upload site 403. For example, in one embodiment, the REPTRACK may provide a plug-in or the like to allow the client to generated the fingerprint. Either the clearinghouse 406 or the UGCS 403 may then check for copyrighted content (420, 430 respectively) by comparing the fingerprint against the fingerprint database 404. If the fingerprint is not in the fingerprint database 404, then the client may send the content for posting 414. If the fingerprint is in the database, then the clearinghouse 406 or the UGCS 403 may instruct the client 402a to refrain from sending the content.

Alternatively, in some embodiments, the client 402a may send the content 414 and the fingerprint 413 more or less simultaneously, and the UGCS 403 or clearinghouse 406 may embargo and/or degrade (431, 421 respectively) the content until the check for copyrighted content (430, 420) has concluded. Should the clearinghouse 406 or UGCS 403 conclude that the content is likely to be a copy of a copyrighted work, the content may not be posted, and may instead be saved or discarded (422, 432). A log of such actions (423, 433), including information identifying the content, may be maintained by the clearinghouse 406 or UGCS 403. In such cases, if the content was initially submitted to the clearinghouse 406, the clearinghouse may notify 424 the UGCS and/or the submitter that the submission has been rejected for posting. If the content was initially submitted to the UGCS 403, the UGCS may notify 434 the submitter that the submission has been rejected for posting. Notification 434 may optionally include the clearinghouse and/or UGCS notifying content owners if content has been rejected for posting. In some situations, content owners might respond and indicate that posting should be allowed, for example if the content owners believe posting of the content could useful for marketing (e.g., viral video).

Alternatively, in some embodiments the client 402a may simply send the content 414 (i.e., not generate 412 or send the fingerprint 413) to the UGCS 403 or clearinghouse 406 for checking (430, 420). In some embodiments in which the client 402a does not send a fingerprint the UGCS 403 or the clearinghouse 406 may embargo and/or degrade (431, 421) the content until the check for copyrighted content (430, 420) has concluded. The fingerprint database 404 may be implemented at the UGCS 403 and/or the clearinghouse 406 using data supplied by a vendor. Alternatively, the fingerprint database 404 may be generated by the UGCS 403 and/or clearinghouse 406 offline or in real time, by "scanning" content, e.g., suspected/likely to be infringed.

Figure 4B:
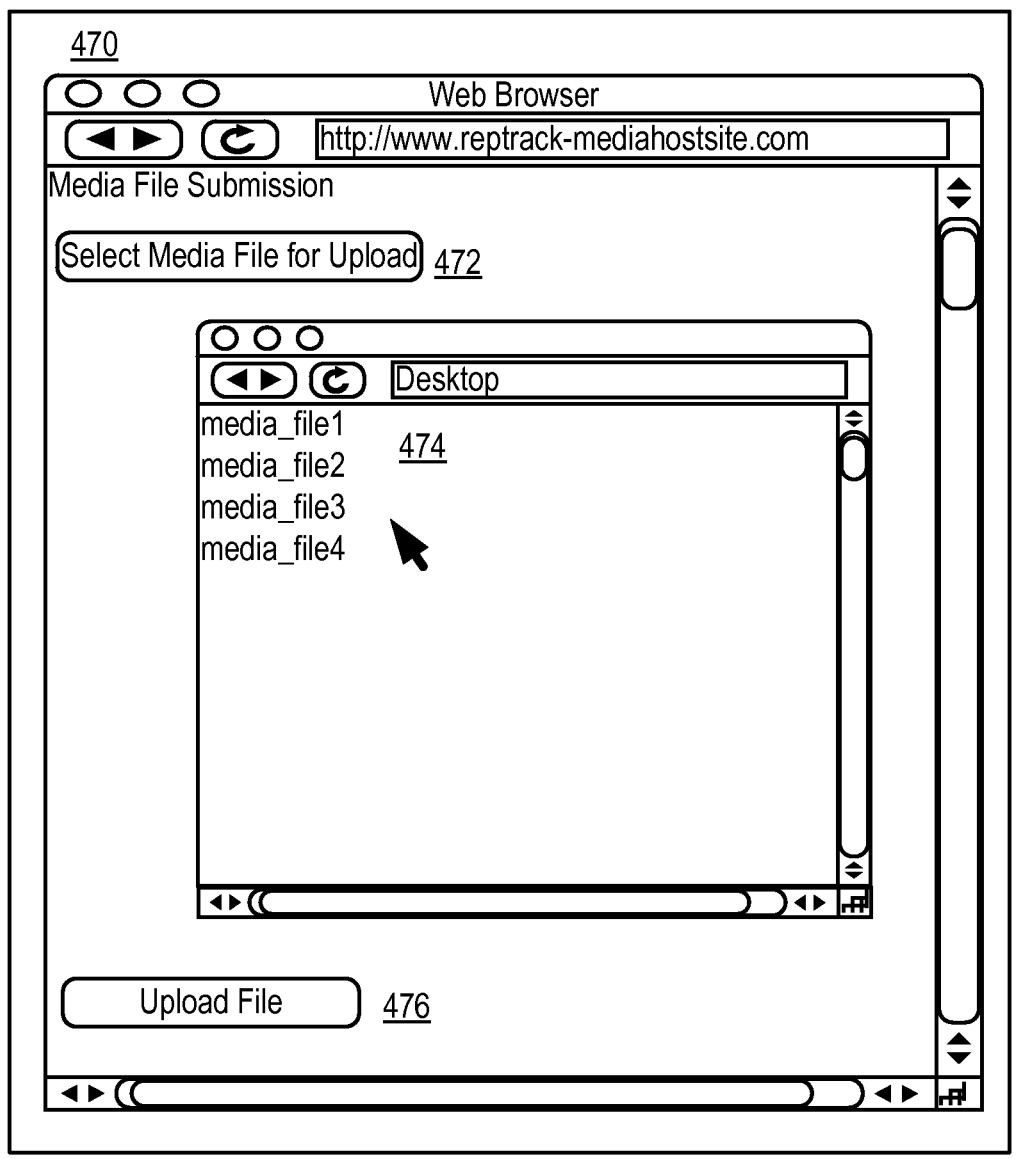

FIG. 4B illustrates an example upload user interface for one embodiment of the REPTRACK. A user may access the interface by navigating their browser 470 to a web site provided by the REPTRACK, a UGCS implementing the REPTRACK, and/or the like. The user then selects a media file to upload 472, in one embodiment by selecting the media file from a list of available media file 474. Once selected, the user may then choose to upload the media file 476.

Reptrack Controller

Figure 5:
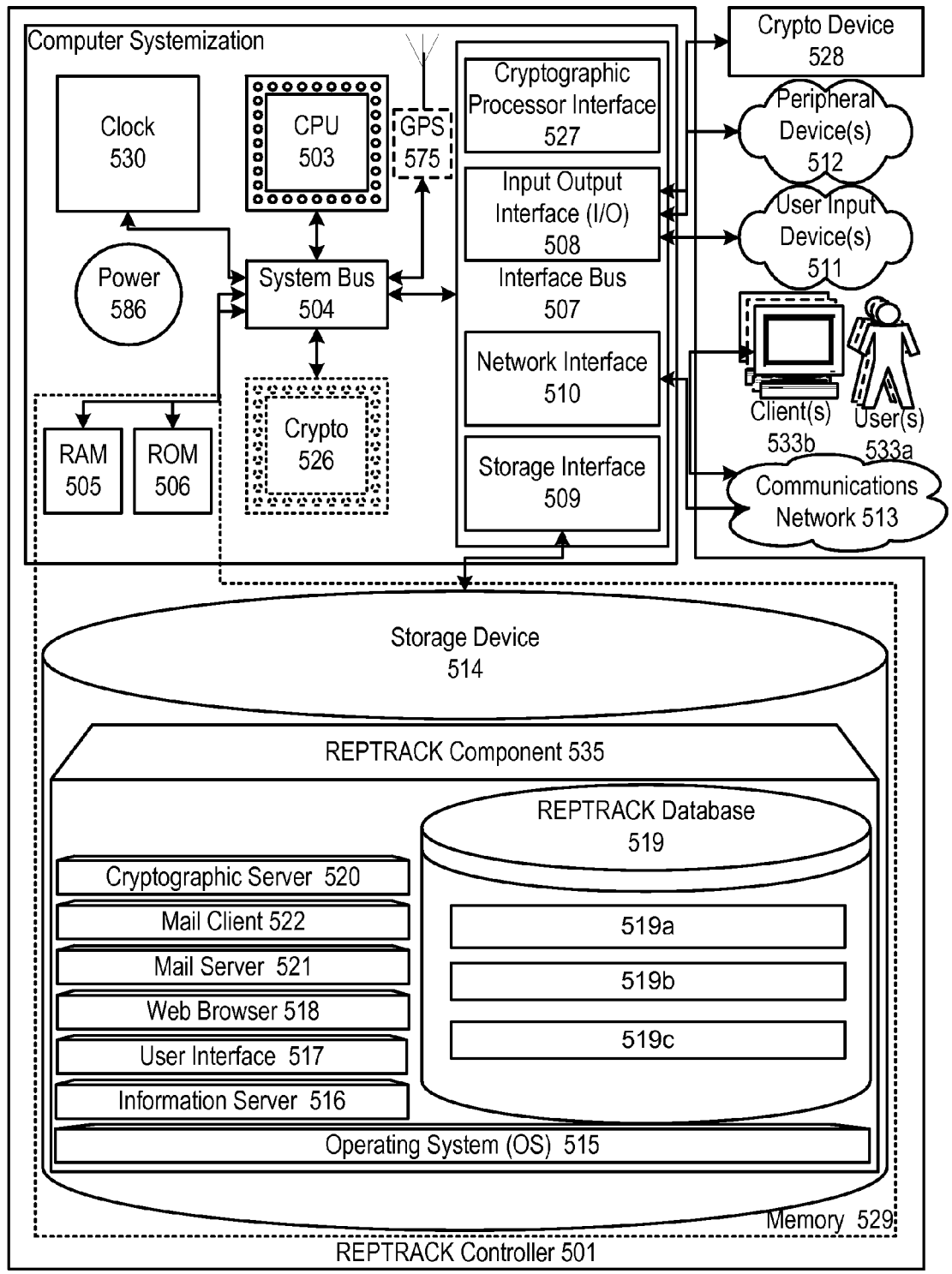
FIG. 5 is of a block diagram illustrating embodiments of a REPTRACK controller.

FIG. 5 of the present disclosure illustrates inventive aspects of a REPTRACK controller 501 in a block diagram. In this embodiment, the REPTRACK controller 501 may serve to aggregate, process, store, search, serve, identify, instruct, generate, match, and/or facilitate interactions with a computer through a variety of technologies, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the REPTRACK controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The REPTRACK controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, the computer systemization may be connected to an internal power source 586. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the REPTRACK controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the REPTRACK thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 113, the REPTRACK controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the REPTRACK controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the REPTRACK controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the REPTRACK controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the REPTRACK component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the REPTRACK controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Nista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the REPTRACK controller to communicate with other entities through a communications network 513. Various communication protocols may be used by the REPTRACK controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the REPTRACK controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the REPTRACK database 519, operating systems, other program components, user interfaces, Web browsers, and/or the like.

Access to the REPTRACK database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the REPTRACK. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the REPTRACK as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gear-shifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NTNista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers may implement plug-ins or like components to display video (e.g., Flash and/or the like). Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the REPTRACK enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the REPTRACK.

Access to the REPTRACK mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the REPTRACK may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the REPTRACK component to engage in secure transactions if so desired. The cryptographic component facilitates the secure accessing of resources on the REPTRACK and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The REPTRACK Database

The REPTRACK database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the REPTRACK database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the REPTRACK database is implemented as a data-structure, the use of the REPTRACK database 519 may be integrated into another component such as the REPTRACK component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c. A user table 519a includes fields such as, but not limited to: user_profile, user_uploads, user_history, user_account_data, user_content, and/or the like. The user table may support and/or track multiple entity accounts on a REPTRACK. A content table 519b includes fields such as, but not limited to: content_tracking, content_details, content_watermarks, content_embedded_info, content_tracking, and/or the like. A rules table 519c includes fields such as, but not limited to: user_rules, upload_rules, content_rules, delay_rules, embargo_rules, checking_rules, tracking_rules, management_rules, and/or the like.

In one embodiment, user programs may contain various user interface primitives, which may serve to update the REPTRACK. Also, various accounts may require custom database tables depending upon the environments and the types of clients the REPTRACK may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-e. The REPTRACK may be configured to keep track of various settings, inputs, and parameters via database controllers.

The REPTRACK database may communicate to and/or with other components in a component collection, including itself, and/or facilities of the like. Most frequently, the REPTRACK database communicates with the REPTRACK component, other program components, and/or the like. The database may contain, retain, and provide information regarding other nodes and data.

The REPTRACKs

The REPTRACK component 535 is a stored program component that is executed by a CPU. In one embodiment, the REPTRACK component incorporates any and/or all combinations of the aspects of the REPTRACK that was discussed in the previous figures. As such, the REPTRACK affects accessing, obtaining and the provision of information, services, transactions, and/or the like across various communications networks.

The REPTRACK component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the REPTRACK server employs a cryptographic server to encrypt and decrypt communications. The REPTRACK component may communicate to and/or with other components in a component collection, including itself, and/or facilities of the like. Most frequently, the REPTRACK component communicates with the REPTRACK database, operating systems, other program components, and/or the like. The REPTRACK may contain, communicate, generate, obtain, and/or provide program component, system, user, and/or data communications, requests, and/or responses. The REPTRACK may provide format conversion. Supported formats may include MPEG1, MPEG2, MPEG4, DIVX4/5, VOB, AVI MS-MPEG4 V3, DIVX 3, WAV, Real Audio, H263(+), H264, RealVideo 1.0, PGM, YUV, PPM, AC3, PCMB/16 bits, VCD, XVCD, XSVCD, mulaw/Alaw, SUN AU format, MPEG audio layer 2, MPEG audio layer 3, MJPEG, and/or the like. In one example embodiment, FFMPEG (http://ffmpeg.mplayerhq.hu/) is used.

Distributed REPTRACKs

The structure and/or operation of any of the REPTRACK node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the REPTRACK controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for content hosting management, comprising:
receiving uploaded content;
identifying a user associated with the uploaded content;

determining a trust level for the identified user;
delaying posting of the content based on the determined trust level of the identified user;
identifying an appropriate content checking procedure level based on the determined trust level;
identifying a content checking procedure based on the identified content checking procedure level;
performing the identified content checking procedure to determine postability of the content; and
posting the uploaded content if the content is determined to be postable.

2. The method of claim 1 wherein determining the postability of the content includes determining if the content contains unauthorized copyrighted material.

3. The method of claim 1 wherein the content checking procedure includes one or more of the following:
checking for watermarks,
checking for fingerprints; and
checking for embedded data.

4. The method of claim 1 wherein the content checking procedure includes vetting of the potential user.

5. The method of claim 1 wherein the content checking procedure is performed by a clearinghouse.

6. The method of claim 5 wherein the clearinghouse receives the uploaded content from the user.

7. The method of claim 1 wherein the determined trust level for the user is based on examining multiple indicia of trust.

8. The method of claim 7 wherein the multiple indicia of trust include one or more of the following:
number of previous uploads submitted by the user,
number of previous uploads submitted by the user which were determined to be unpostable,
length of time over which the user has uploaded content,
user identity verification information.

9. The method of claim 1, wherein the posting delay of the content is also based on an analysis of the content characteristics.

10. The method of claim 9 wherein the content characteristics include one or more of the following:
the quality of the content,
the size of the content.

11. The method of claim 1, further comprising:
generating a fingerprint for the content;
storing the fingerprint in a fingerprint database; and
applying the fingerprint to the content.

12. The method of claim 11 wherein the fingerprint is generated based on the content.

13. The method of claim 11 wherein the fingerprint is generated based on the identified user.

14. A processor-implemented method for copyright sensitive media content hosting, comprising:
receiving uploaded media content;
identifying a user associated with the uploaded media content;
determining a trust level for the identified user;
performing an initial analysis of the uploaded media content;
temporarily posting an altered version of the media content until a determination of postability can be made,
wherein the alteration of the media content is based on the determined trust level of the user and the initial analysis of the uploaded media content;
identifying an appropriate rights verification procedure based on the determined trust level of the user and the initial analysis of the media content;
performing the identified rights verification procedure to determine postability of the content; and
posting a non-altered version of the uploaded media content if the media content is determined to be postable.

15. The method of claim 14 wherein the initial analysis of the uploaded media content includes determining whether the media content is labeled as high resolution.

16. A processor-implemented method for copyright sensitive video hosting management, comprising:
receiving an uploaded video file;
identifying a user associated with the uploaded video file;
determining a trust level for the identified user,
wherein the trust level determination is based on an analysis of the user's previous video file uploads,
wherein the analysis includes determining a number of previous video file uploads and whether any of said uploads contained unauthorized copyrighted content;
applying an at least one rule for posting of the uploaded video file,
wherein the at least one rule is selected from a rule set according to the determined trust level of the identified user,
wherein the rule set includes:
a rule for delaying the posting of the video file until a determination has been made that the uploaded video file does not contain unauthorized copyrighted content;
identifying an appropriate rights verification procedure based on the determined trust level of the identified user;
performing the identified rights verification procedure to determine if the video file has indicators of unauthorized copyrighted content,
wherein the rights verification procedure is performed by a clearinghouse;
posting the video file if the rights verification procedure indicates that the file does not contain unauthorized copyrighted content.

17. The method of claim 16 wherein the rights verification procedure includes at least one of the following:
determining if the video file has watermarks indicating unauthorized, copyrighted content and
determining if the video file has fingerprints indicating unauthorized copyrighted content.

18. The method of claim 16 further comprising a rule for posting an altered version of the video file until a determination has been made as to whether the uploaded video file contains unauthorized copyrighted content.

19. The method of claim 16, wherein the analysis further includes determining a number of previous acceptable video file uploads.

20. A processor-implemented method for copyright sensitive media hosting management, comprising:
receiving an uploaded media file;
determining characteristics of the uploaded media file;
identifying a user associated with the uploaded media file;
determining a trust level for the identified user based on determining a number of the user's previous video file uploads;
generating a fingerprint for the uploaded media file;
storing the fingerprint in a fingerprint database;
applying the fingerprint to the uploaded media file;
applying an at least one rule for posting of the uploaded media file;
performing rights verification on the uploaded media file; and
posting the media file if the rights verification indicates that the media file does not contain unauthorized copyrighted content.

21. The method of claim 20 wherein the generation of the fingerprint is based on the determined characteristics of the uploaded media file.

22. The method of claim 20 wherein the generation of the fingerprint is based on the identified user.

* * * * *